United States Patent
Hellio et al.

(10) Patent No.: US 6,868,315 B2
(45) Date of Patent: Mar. 15, 2005

(54) FLIGHT CONTROL SYSTEM FOR CONTROLLING THE PITCH OF AN AIRCRAFT WITH VERTICAL TAKEOFF AND WITH AN ORIENTABLE LIFT DIRECTION

(75) Inventors: Patrick Hellio, Bouc-Bel-Air (FR); Philippe Alain Rollet, Velaux (FR)

(73) Assignee: Eurocopter, Marignane Cedex (FR)

( * ) Notice: Subject to any disclaimer, the term of this patent is extended or adjusted under 35 U.S.C. 154(b) by 121 days.

(21) Appl. No.: 10/292,806

(22) Filed: Nov. 13, 2002

(65) Prior Publication Data

US 2003/0135307 A1 Jul. 17, 2003

(30) Foreign Application Priority Data

Nov. 14, 2001 (FR) .............................. 01 14709

(51) Int. Cl.[7] .............................................. B64C 29/00
(52) U.S. Cl. ............................ 701/4; 244/7 R; 244/7 A
(58) Field of Search ......................... 701/3–4; 244/7 R, 244/7 A–7 C, 17.13, 17.25, 66, 75 R

(56) References Cited

U.S. PATENT DOCUMENTS

| 5,115,996 | A | * | 5/1992 | Moller | .................. 244/12.5 |
|---|---|---|---|---|---|
| 5,839,691 | A | * | 11/1998 | Lariviere | ..................... 244/7 R |
| 5,951,608 | A | * | 9/1999 | Osder | .......................... 701/11 |
| 6,070,829 | A | | 6/2000 | Bellera et al. | |
| 6,227,481 | B1 | * | 5/2001 | Fenny et al. | ................ 244/7 R |
| 6,607,161 | B1 | * | 8/2003 | Krysinski et al. | ........... 244/7 A |
| 2004/0026563 | A1 | * | 2/2004 | Moller | ...................... 244/12.4 |

FOREIGN PATENT DOCUMENTS

| EP | 1090836 | 4/2001 |
|---|---|---|
| FR | 2756252 | 5/1998 |

* cited by examiner

*Primary Examiner*—Gary Chin
(74) *Attorney, Agent, or Firm*—Stevens, Davis, Miller & Mosher, LLP

(57) ABSTRACT

A flight control system for controlling the pitch of an aircraft having a vertical takeoff capability and an orientable lift direction may include a first device, to which a pitch command determined by a computing unit is applied, for actuating an element acting on the pitch of the aircraft. A second device of the flight control system receives an orientation order to actuate an element altering the orientation of the lift direction. Another device determines an orientation order for optimizing a flight parameter based on the pitch command determined by the computing unit. Yet another device subtracts from the pitch command the pitch contribution due to actuating the orientation element. The difference value acts as a pitch command to the first device.

11 Claims, 2 Drawing Sheets

FLIGHT CONTROL SYSTEM FOR CONTROLLING THE PITCH OF AN AIRCRAFT WITH VERTICAL TAKEOFF AND WITH AN ORIENTABLE LIFT DIRECTION

BACKGROUND OF THE INVENTION

The present invention relates to a flight control system for controlling at least the pitch of an aircraft with vertical takeoff, the lift direction of which can be oriented with respect to the aircraft structure.

DESCRIPTION OF THE PRIOR ART

Although not exclusively, the present invention is most particularly applicable to a normal aircraft of "convertible" type, comprising rotors which are mounted on nacelles capable of being tilted with respect to the aircraft structure. On such a convertible aircraft, during takeoff, the rotors are oriented almost vertically so as to operate like a rotary wing, in order to allow vertical takeoff in the manner of a helicopter. On the other hand, during cruising flight, said rotors are oriented almost horizontally so as to operate as airscrews, in order to allow flight in the manner of an airplane.

On such a convertible aircraft, tilting of the nacelles supporting the rotors is an operation which is controlled, manually, by the pilot. One of the difficulties encountered consists in complying with the limits of the flight envelope of the aircraft, while optimizing the tilting of the nacelles so as to obtain the best possible performance. This results in a relatively high workload for the pilot.

For example, during an acceleration maneuver in horizontal flight from stationary flight, the pilot must gradually tilt the nacelles forward so as to preserve a horizontal pitch attitude, as soon as the speed becomes significant. This is because not actuating the nacelles would lead to encountering, as on a helicopter, markedly negative pitch attitudes, for example of about −5° to −10°. Now, on a convertible aircraft, such negative attitudes must be avoided, since they are very detrimental to performance, especially because of the aerodynamic downlift which they generate on the wing.

Thus, on such a convertible aircraft, the system for controlling the pitch axis, which especially comprises:
- controls (control sticks or ministicks) capable of being actuated by a pilot of the aircraft;
- actuating means, generally servocontrols, for actuating controlled elements (aerodynamic elevation control surfaces and rotors) designed to act on the pitch of the aircraft; and
- a computing unit using a piloting law, for determining commands for said actuating means, as a function of the action exerted on said controls by the pilot, is independent and decorrelated from the system for manually controlling nacelles, which itself comprises at least one control which can be actuated by a pilot in order to control, via an actuation logic module, the tilting of the nacelles.

It will be noted that, on some convertible aircraft, there is sometimes a way of automating the tilting of the nacelles, but this is only actuated to prevent inadvertently exceeding the limits of the authorized "nacelle angle—speed" envelope (also denoted as "conversion corridor"). It therefore mainly has a function of protecting the flight envelope, and not a function of optimizing performance, the tilting of the nacelles during acceleration remaining completely the responsibility of the pilot.

SUMMARY OF THE INVENTION

The object of the present invention is to overcome these drawbacks. It relates to a flight control system, for controlling at least the pitch of an aircraft with vertical takeoff, the lift direction of which can be oriented with respect to the aircraft structure, which makes it possible both to:
- automatically optimize at least one flight parameter; and
- decrease the pilot's workload.

To this end, according to the invention, said flight control system of the type comprising:
- at least a first control capable of being actuated by a pilot of the aircraft;
- at least a first actuating means, to which a pitch command is applied, for actuating at least one controlled element capable of acting on the pitch of the aircraft;
- a computing unit for determining a first pitch command, depending on at least the actuation of said first control;
- at least a second control capable of being actuated by a pilot of the aircraft;
- at least a second actuating means, to which an orientation order is applied, for actuating at least one orientable element making it possible to alter the orientation of the lift direction; and
- a computing means for determining and transmitting, to said second actuating means, an orientation order dependent on at least the actuation of said second control, is distinguished in that said computing means automatically determines an orientation order making it possible to optimize at least one predetermined flight parameter, as a function of said first pitch command determined by said computing unit, and in that said flight control system further comprises auxiliary means for subtracting from the pitch command the pitch contribution due to actuating the orientable element according to said orientation order, so as to obtain a second pitch command which is transmitted and applied to said first actuating means for actuating the controlled element.

Thus, by virtue of said computing means, said flight control system makes it possible to automatically optimize a flight parameter (preferably a static flight parameter in order to optimize the static equilibrium of the aircraft) or a combination of a plurality of such flight parameters so as to improve the performance of the aircraft.

Furthermore, by virtue of the invention, the controls of the controlled element(s) and of the orientable element(s) are combined in order to pilot the pitch of the aircraft. Thus, for example, in the case of a convertible aircraft, the overall pitch order, controlled by the pilot, is distributed not only over the rotors and the elevation control surfaces, as on the normal convertible aircraft, but also over the nacelles supporting the rotors.

Advantageously, said computing unit and said computing means form part of a flight control device which is electrical or optical.

According to the invention, said flight control system further comprises an auxiliary computing means which is combined with said computing means and which determines an objective command, corresponding to a pitch control which must be executed in order to optimize said predetermined flight parameter.

Furthermore, advantageously, said flight control system further comprises a computing assembly which is linked to said computing means and which comprises the set of following elements linked to each other:
- a differentiator which finds the difference between the first pitch command, determined by said computing unit, and the objective command determined by said auxiliary computing means;
- a computing element which multiplies this difference by a predetermined factor;
- a low-frequency filter;
- a speed limiter; and
- an authority limiter.

Moreover, preferably:
said flight parameter corresponds to at least one of the following parameters of the aircraft:
- static flight attitude;
- power consumed; and
- static cyclic flapping of at least one rotor, where the aircraft has a rotor; and/or said computing means determines said orientation order as a function of the flight scenario of the aircraft.

In a first embodiment, said auxiliary means comprise an auxiliary computing means which automatically calculates the difference between said first pitch command, determined by the computing unit, and said pitch contribution due to actuating the orientable element, so as to obtain said second pitch command which is transmitted and applied to said first actuating means for actuating the controlled element.

In this case, advantageously, said flight control system further comprises a computing element for multiplying the orientation order by a predetermined gain in order to obtain said pitch contribution.

In this first embodiment, the pitch contribution, due to control of the orientable element, is subtracted, directly and automatically, from the pitch command determined by the computing unit.

Furthermore, in a second embodiment, said auxiliary means comprise said computing unit which automatically takes into account said pitch contribution due to actuating the orientable element, in order to determine directly said second pitch command which is transmitted and applied to said first actuating means for actuating the controlled element.

In this second embodiment, the pitch contribution, due to control of the orientable element, is automatically, but indirectly subtracted by corrections made (automatically) by the computing unit.

Moreover, in a third embodiment, said auxiliary means comprise said first control which is capable of being actuated by a pilot of the aircraft, in order to take into account (indirectly) said pitch contribution due to actuating the orientable element.

As indicated above, the flight control system according to the invention is more particularly suitable for controlling the pitch of a convertible aircraft comprising at least one rotor generating the lift and mounted on a nacelle which is capable of being tilted with respect to the aircraft structure. In this case, according to the invention, said second actuating means is capable of generating the tilt of said nacelle.

BRIEF DESCRIPTION OF THE DRAWINGS

The figures of the appended drawing will make it clear to understand how the invention can be produced. In these figures, identical references denote similar elements.

DESCRIPTION OF THE PREFERRED EMBODIMENTS

Figure 1:
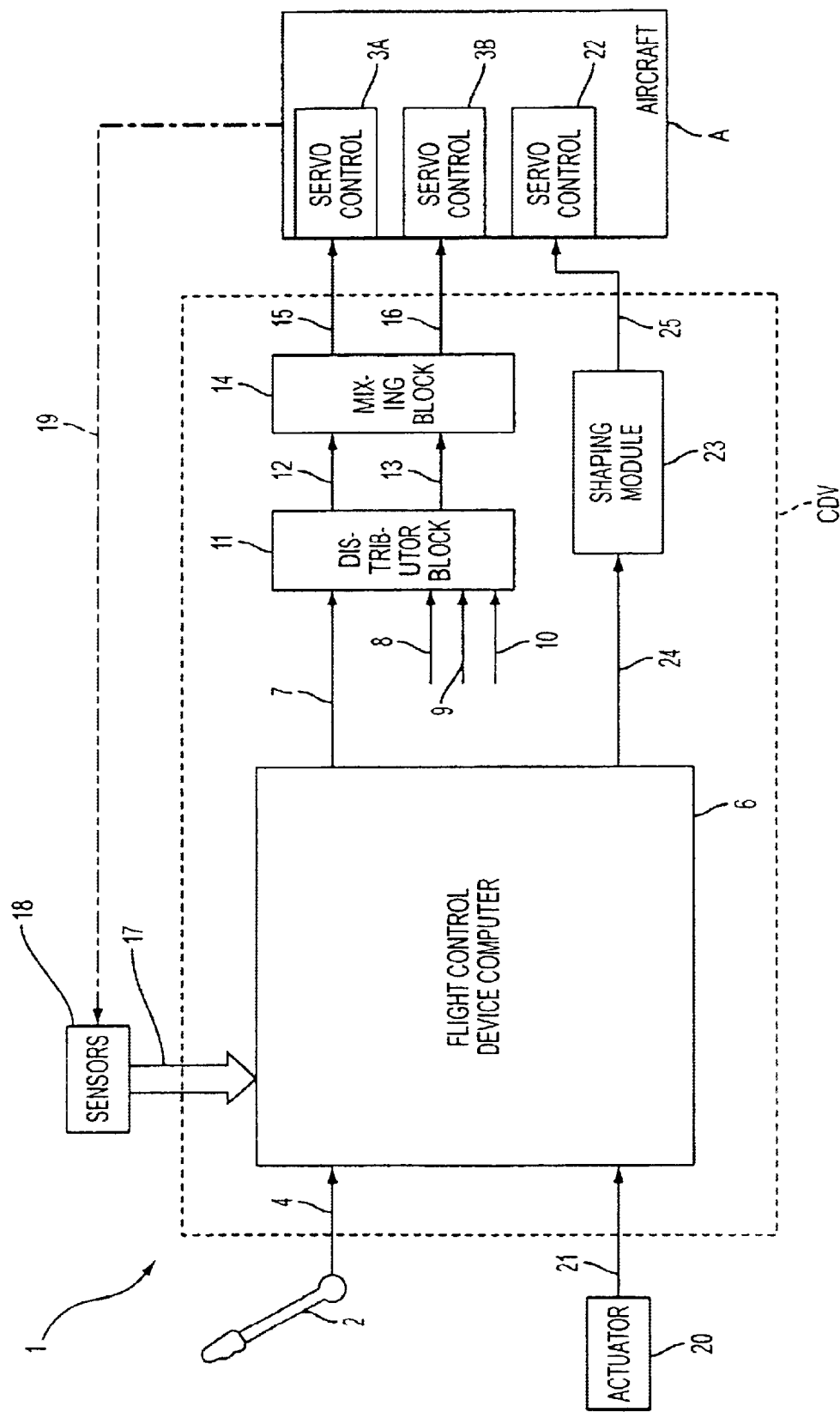
FIG. 1 is a block diagram of a flight control system according to the invention.

The flight control system 1 shown schematically in FIG. 1 and according to the present invention is intended to control at least the pitch of an aircraft A with vertical takeoff, the lift direction of which can be oriented with respect to the structure of said aircraft A.

By way of nonlimiting example, said aircraft A is a normal aircraft of "convertible" type which comprises a plurality of rotors, preferably two rotors, mounted on nacelles capable of being tilted with respect to the aircraft structure. On such a convertible aircraft, during takeoff, the rotors are oriented almost vertically so as to operate as a rotary wing, in order to allow vertical takeoff in the manner of a helicopter. On the other hand, during cruising flight, said rotors are oriented almost horizontally so as to operate as airscrews, in order to allow flight in the manner of an airplane.

The system 1 shown schematically in FIG. 1 is mounted on board the aircraft A, although, for reasons of clarity of the drawing, said aircraft A is shown in small scale, external to said system 1.

In a known manner, said system 1 comprises, for control with respect to at least the pitch control axis:
- at least one control 2 (stick or ministick) capable of being actuated by a pilot of the aircraft A;
- actuating means 3A and 3B (for example, servocontrols), to which pitch commands are applied, for actuating controlled elements (rotors and one or more aerodynamic elevation control surfaces [not shown] in the case of a convertible aircraft) capable of acting on the pitch of the aircraft A; and
- a computing unit 5 which is integrated into a computer 6 of a flight control device CDV of electrical or optical type, and which is linked by a link 4 to the control 2. Said computing unit 5 comprises a piloting law in order to determine a first pitch command which is dependent on at least actuating said control 2.

In addition to preparing the pitch command, it is known that the computer 6 of the flight control device CDV also prepares roll, collective and yaw commands, which are not specified further, since they do not directly relate to implementing the present invention. The various commands (pitch, roll, collective, yaw) are transmitted via links 7 to 10, respectively, to a distributor block 11 allowing separation between the commands for axes designed for various controlled elements (which are especially capable of acting on the pitch of the aircraft A), for example, as the case may be, between those intended for the rotors and those intended for the aerodynamic control surfaces of a convertible aircraft. The commands separated in this way are then transmitted via links 12 and 13, respectively, to a mixing block 14 for processing, before being addressed to said servocontrols 3A and 3B (for example, rotors and aerodynamic control surfaces, respectively) via links 15 and 16.

To prepare the various commands, the flight control device CDV uses, in addition to the positions of the various controls, including the control 2, information concerning the conditions of the aircraft A, such as the attitudes and the load factors, for example, which are received via a link 17 from a set 18 of sensors which are mounted on the aircraft A, as illustrated by a link 19 in dot-dash lines.

Moreover, in order to control the orientation of the lift direction (generated in particular by rotors with tilting nacelles of a convertible aircraft), the system 1 comprises at least one actuator 20 which is linked via a link 21 to the computer 6. The computer 6 generates a command which is transformed for adoption by a shaping module 23 (which is linked to the computer 6 and to servocontrols 22 by links 24 and 25, respectively), into an orientation order (for example, an order for tilting nacelles) for actuating means 22 (servocontrols) for actuating orientable elements (said nacelles for example) capable of altering the orientation of the lift direction of the aircraft A.

In a normal flight control system, the control system for the pitch and the control system for tilting the orientable elements (nacelles) are independent of each other. This has many drawbacks. In particular, the tilting of the orientable elements (nacelles) must always be manually controlled by the pilot, which leads to a considerable workload for the latter.

The flight control system 1 according to the invention makes it possible to overcome these drawbacks.

To this end:
said computer 6 comprises a computing means 27 which automatically determines (in connection with the shaping module 23) an orientation order (for example, an order for tilting the nacelles) making it possible to optimize at least one predetermined flight parameter, as a function of the first pitch command determined by said computing unit 5; and said flight control system 1 further comprises auxiliary means (which can be made according to one of three different embodiments 28A, 28B, 28C, specified below) for subtracting from the pitch command (controlled by the pilot) the pitch contribution due to actuating the orientable elements (for example, nacelles) according to said orientation order determined by the means 27 and 23, so as to obtain a second pitch command, which is transmitted via the link 7, in order to be applied to the actuating means 3A and 3B actuating the controlled elements (rotors and aerodynamic control surfaces).

Thus, by virtue of said computing means 27, said flight control system 1 makes it possible to optimize automatically a flight parameter (preferably a static flight parameter in order to optimize the static equilibrium of the aircraft A) or a combination of a plurality of such flight parameters so as to improve the performance of said aircraft A.

Preferably:
said flight parameter corresponds to at least one of the following parameters of the aircraft A:
static flight attitude;
power consumed; and
static cyclic flapping of at least one rotor, where the aircraft A has a rotor; and
said computing means 27 determines said orientation order as a function of the flight scenario of the aircraft (forward speed, flap position, nacelle angles, etc.).

Thus, by virtue of the invention, in the case of a convertible aircraft A, the order for piloting overall pitch is distributed between the basic pitch command and the command for inclining the nacelles, in such a way as to optimize the chosen flight parameter (or a combination of the chosen flight parameters). Consequently, the overall pitch order, controlled by the pilot, is distributed not only over the rotors and the elevation control surface or surfaces, as on the normal convertible aircraft, but also over the nacelles. This piloting logic is applicable, mainly, to the "helicopter" part of the flight envelope of the convertible aircraft A, that is to say within the authorized flight envelope having a nacelle angle between about 100° and 60° with respect to the horizontal.

Furthermore, as will be seen in more detail below, the systems for controlling the pitch and for controlling the tilt of the nacelles are no longer independent, but completely interlinked, each one of them being affected by the behavior of the other.

Within the scope of the present invention, the computing unit 5 may implement various types of known piloting laws for the pitch axis. In particular, it can use a law of "direct" type, a law of "attitude" type, a law of "translational rate" type (called TRC: "Translational Rate Command"), or else any other type of law suitable for piloting the pitch axis of an aircraft of the aforementioned type, fitted with an electrical or optical flight control device CDV.

Figure 2:
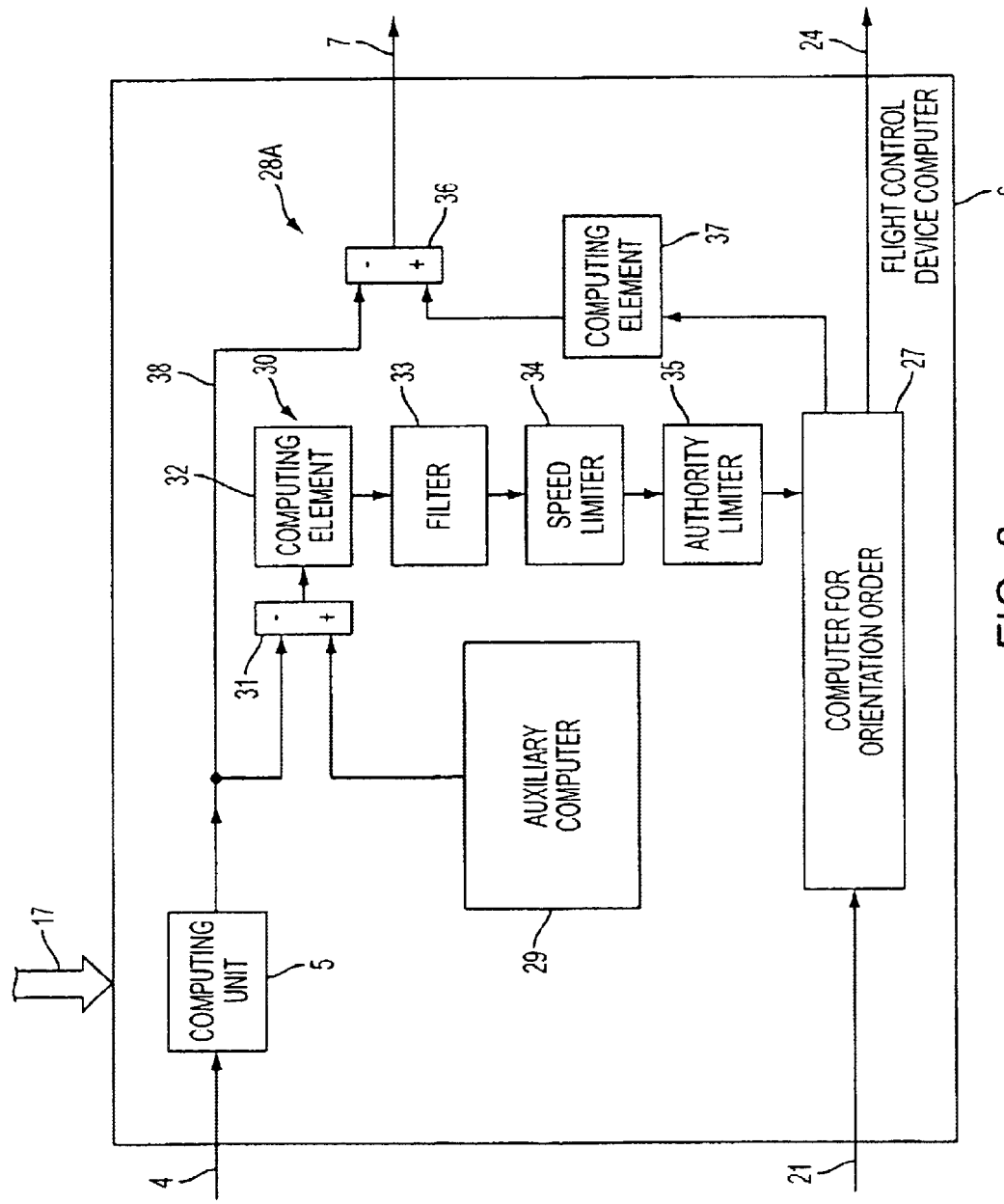
FIG. 2 is a block diagram of a particular computer, forming part of a flight control system according to the invention.

According to the invention, said computer 6 further comprises, as shown in FIG. 2, an auxiliary computing means 29 which is combined with said computing means 27 and which determines an objective command, corresponding to a pitch command which must be executed in order to optimize said predetermined flight parameter(s). This objective command arises from an interpolation in a preprogrammed table, whose values are results of known equilibrium calculations, carried out using a mechanical tool for normal flight.

The computer 6 further comprises a computing assembly 30 which is linked to said computing means 27 and which comprises the following set of elements, connected to each other:
a differentiator 31 which finds the difference between the first pitch command, determined by said computing unit 5, and the objective command determined by said auxiliary computing means 29;
a computing element 32 which multiplies this difference by a predetermined factor Keff. This factor Keff is a gain making it possible to take into account the difference in efficiency between the actuating means 3A, 3B and the actuating means 22, for the pitch piloting;
a low-frequency filter 33;
a speed limit 34; and
an authority limiter 35, which is directly linked to said computing means 27.

Said low-frequency filter 33 makes it possible to adjust the dynamic range with which the orientable element (nacelle) is activated, in order to comply with flight operating restrictions:
the speed must be low enough so as not to disturb the instantaneous piloting (control of the aircraft A about its center of gravity); and
it must be sufficient so that the tilting is terminated when the pilot seeks to stabilize the aircraft A on the new flight scenario (guiding the aircraft A on the trajectory).

Furthermore, said speed limiter 34 makes it possible to limit the maximum control speed, in the case of a high control amplitude. This limit is less than the maximum speed of the actuating means (mechanical limit). The presence of this speed limiter 34 makes it possible to comply with the pitch reference value.

Moreover, the authority limiter 35 prevents the actuating means 22 being controlled above the maximum acceptable values for the function carried out.

In the preferred embodiment shown in FIG. 2, said auxiliary means 28A comprise an auxiliary computing means 36 which automatically calculates the difference between said first pitch command, determined by the computing unit 5 (and received by a link 38), and said pitch contribution representative of the orientation order emitted by the computing means 27, so as to form the pitch command which is transmitted by the link 7 in order to be applied to the aircraft A.

Thus, said pitch contribution is subtracted, directly and automatically, from the command emitted by the computing unit 5.

This pitch contribution corresponds to the orientation order determined by the computing means 27, which is multiplied by a predetermined factor 1/Keff in a computing element 37.

It will be noted that the computing element 37 still makes it possible, for example where the computer 6 deteriorates, to reconfigure the orientation command for the orientable elements (for example the command for tilting nacelles) into a manual or semiautomatic command [it is then necessary to cancel out the gain 1/Keff (computing element 37)].

Variant embodiments consist in not activating the gain 1/Keff (computing element 37) and in adding an integrator to the gain Keff (computing element 32). This therefore amounts to:
  canceling the command previously subtracted from the basic pitch command (computing element 36 inactive or absent); and
  commanding the orientable elements (nacelles) for as long as the command is different from the objective. In this case, the pitch axis command (same order transmitted over the links 38 and 7) is not necessarily altered automatically in order to counter the almost static tilting of the orientable elements (nacelles). This is because the pitch command available on the links 38 and 7 is adjusted (to reach the objective set by the auxiliary computing means 29):
    in a first variant, automatically, by the computing means 5 which has a suitable piloting law for this purpose; and
    in a second variant, manually, by actuation of the control 2 by the pilot.
  Consequently:
  in said first variant, the aforementioned auxiliary means 28B (not shown) comprise the computing unit 5; and
  in said second variant, the aforementioned auxiliary means 28C (not shown) comprise the control 2.

Consequently, the present invention makes it possible to distribute the overall pitch order controlled by the pilot, not only over the controlled elements (rotors and elevation control surfaces), as for the normal (convertible) aircraft, but also over the orientable element (nacelles) according to the following principle:
  the pitch order is completely addressed to the controlled elements (rotors and elevation control surfaces);
  the orientable elements (nacelles) are activated with a small dynamic range and so as to optimize the predetermined flight parameter or parameters; and
  the contribution provided by activating the orientable elements (nacelles) to modifying the pitch equilibrium is at the same time subtracted from the commands of the controlled elements (rotors and elevation control surfaces):
    either directly and automatically (by taking account of the various efficiency ratios) [by virtue of the auxiliary means 28A];
    or indirectly by corrections provided by the basic piloting law [auxiliary means 28B] or by the pilot himself [auxiliary means 28C]. This involves corrections needed to maintain the flight scenario while the position of the orientable elements (nacelles) is adjusted. These corrections are imperceptible with respect to the piloting.

What is claimed is:

1. A flight control system for controlling at least the pitch of an aircraft with vertical takeoff, the lift direction of which can be oriented with respect to the aircraft structure, said flight control system comprising:
  at least a first control capable of being actuated by a pilot of the aircraft;
  at least a first actuator, to which a pitch command is applied, for actuating at least one controlled element capable of acting on the pitch of the aircraft;
  a computing unit for determining a first pitch command, depending on at least the actuation of said first control;
  at least a second control capable of being actuated by the pilot of the aircraft;
  at least a second actuator, to which an orientation order is applied, for actuating at least one orientable element making it possible to alter the orientation of the lift direction; and
  a first computer for determining and transmitting, to said second actuator, said orientation order dependent on at least the actuation of said second control, wherein
  said first computer automatically determines said orientation order making it possible to optimize at least one predetermined flight parameter, as a function of said first pitch command determined by said computing unit, and wherein said flight control system further comprises an auxiliary unit for subtracting from the first pitch command the pitch contribution due to actuating the at least one orientable element according to said orientation order, so as to obtain a second pitch command which is transmitted and applied to said first actuator for actuating the at least one controlled element.

2. The system as claimed in claim 1, wherein said computing unit and said first computer form part of a flight control device.

3. The system as claimed in claim 1, which further comprises an auxiliary computer which is combined with said first computer and which determines an objective command, corresponding to a pitch control which must be executed in order to optimize said at least one predetermined flight parameter.

4. The system as claimed in claim 3, which further comprises a computing assembly which is linked to said first computer and which comprises the set of following elements linked to each other:
  a differentiator which finds the difference between the first pitch command, determined by said computing unit, and the objective command determined by said auxiliary computer;
  a computing element which multiplies said difference by a predetermined factor;
  a low-frequency filter;
  a speed limiter; and
  an authority limiter.

5. The system as claimed in claim 1, wherein said at least one predetermined flight parameter corresponds to at least one of the following parameters of the aircraft:
  static flight attitude;
  power consumed; and static cyclic flapping of at least one rotor, where the aircraft has a rotor.

6. The system as claimed in claim 1, wherein said first computer means determines said orientation order as a function of the flight scenario of the aircraft.

7. The system as claimed in claim 1, wherein said auxiliary unit comprises an auxiliary computer which automatically calculates the difference between said first pitch command, determined by the computing unit, and said pitch contribution due to actuating the at least one orientable element, so as to obtain said second pitch command which is transmitted and applied to said first actuator for actuating the at least one controlled element.

8. The system as claimed in claim 7, which further comprises a computing element for multiplying the orientation order by a predetermined gain in order to obtain said pitch contribution.

9. The system as claimed in claim 1, wherein said auxiliary unit comprise said computing unit which automatically takes into account said pitch contribution due to actuating the at least one orientable element, in order to determine directly said second pitch command which is transmitted and applied to said first actuator for actuating the at least one controlled element.

10. The system as claimed in claim 1, wherein said auxiliary unit comprises said first control which is capable of being actuated by said pilot of the aircraft, in order to take into account said pitch contribution due to actuating the at least one orientable element.

11. The system as claimed in claim 1, wherein said second actuator is capable of generating the tilt of a nacelle with respect to the aircraft structure, the aircraft being a convertible aircraft and comprising at least one rotor generating the lift and mounted on said nacelle.

* * * * *